United States Patent [19]
Zimmerman et al.

[11] Patent Number: 6,144,536
[45] Date of Patent: Nov. 7, 2000

[54] ILLUMINATION SYSTEM WITH LIGHT RECYCLING TO ENHANCE BRIGHTNESS

[75] Inventors: Scott M. Zimmerman, Basking Ridge; Karl W. Beeson, Princeton; Han Zou, Windsor, all of N.J.

[73] Assignee: Honeywell International Inc., Morristown, N.J.

[21] Appl. No.: 09/022,722

[22] Filed: Feb. 12, 1998

Related U.S. Application Data

[60] Provisional application No. 60/037,754, Feb. 13, 1997.

[51] Int. Cl.[7] ....................................................... F21V 7/04
[52] U.S. Cl. .............................. 361/31; 362/26; 362/307; 362/308; 362/330; 362/339; 362/551; 362/555; 362/582
[58] Field of Search ................................ 362/31, 26, 307, 362/308, 330, 339, 551, 555, 582

[56] References Cited

U.S. PATENT DOCUMENTS

| | | |
|---|---|---|
| 5,396,350 | 3/1995 | Beeson et al. ............................. 359/40 |
| 5,402,324 | 3/1995 | Yokoyama et al. .................... 362/31 X |
| 5,410,454 | 4/1995 | Murase et al. ............................. 362/31 |
| 5,428,468 | 6/1995 | Zimmerman et al. .................... 359/40 |
| 5,467,417 | 11/1995 | Nakamura et al. .................... 362/31 X |
| 5,521,725 | 5/1996 | Beeson et al. ......................... 362/31 X |
| 5,572,411 | 11/1996 | Watai et al. ............................. 362/31 |
| 5,598,280 | 1/1997 | Nishio et al. ......................... 362/31 X |
| 5,856,855 | 1/1999 | Mol et al. ................................. 349/65 |
| 5,993,020 | 11/1999 | Koike ....................................... 362/31 |

FOREIGN PATENT DOCUMENTS 2 281 802  3/1995  United Kingdom .

OTHER PUBLICATIONS

Patent Abstracts of Japan—vol. 096, No. 008, Aug. 30, 1996 & JP 08 095501 A (Sanyo Electric Co Ltd; Tottori Sanyo Electric Co Ltd), Apr. 12, 1996.
PCT International Search Report.
PCT Notification of Transmittal of the International Search Report.

*Primary Examiner*—Sandra O'Shea
*Assistant Examiner*—Ronald E. DelGizzi
*Attorney, Agent, or Firm*—Charlotte H. Copperthite; John G. Shudy, Jr.

[57] ABSTRACT

An optical illumination system is comprised of: (a) a light source means having a reflective emitting surface and an intrinsic luminance (brightness), (b) a light transmitting means; (c) a light reflecting means to reflect and recycle a portion of the light emitted by the light source means back to the light source means; and (d) a light extracting means to extract a portion of the light from the light transmitting means and direct the light to the output of the illumination system. The resulting illumination system achieves an enhanced output luminance. Under certain conditions, it is possible to achieve an output luminance that is greater than the intrinsic luminance of the bare light source.

17 Claims, 5 Drawing Sheets

ILLUMINATION SYSTEM WITH LIGHT RECYCLING TO ENHANCE BRIGHTNESS

CROSS REFERENCE TO RELATED APPLICATIONS

This application claims the benefits of U.S. Provisional Application No. 60/037,754 filed Feb. 13, 1997.

TECHNICAL FIELD

This invention relates generally to illumination systems and electronic displays, including illumination systems for flat panel displays.

INTRODUCTION

Various devices use or incorporate illumination systems, either to act as light sources per se or provide light for some other purpose. For example, small, portable computers, such as laptops and the newer notebook computers, have been in increasing demand in recent years. As technology has improved, the notebook units have come to more fully emulate their desk-top counterparts. To do so, the computing power and display capabilities have had to improve greatly.

With respect to the display, most users expect large, clear, bright viewing screens, equaling the performance of the cathode-ray-tube ("CRT") monitors sitting on their desks. To meet this need, computer manufacturers have sought to build a flat panel display offering superior resolution, color, and contrast while at the same time requiring minimal power. One of the difficulties encountered in this regard is producing a display that offers sufficient luminance (brightness) in a large variety of ambient light situations.

Typically, the illumination system for such flat panel displays employs a diffuse light source, for example a fluorescent source, that provides an output to a backlight structure that directs diffuse light rays through the display. By diffuse, we mean the light distribution has a full width at one-half maximum (FWHM) greater than about 50 degrees (plus or minus 25 degrees from the center of the distribution). The illumination system may consist of a light transmitting means, for example a waveguide (light pipe), that transmits light from the light source located adjacent to the input surface of the light transmitting means and distributes the light across the output surface of the illumination system. Some types of illumination systems that utilize a waveguide as the light transmitting means may have light scattering features, such as white dots printed or etched onto the waveguide, that direct light out of the output surface of the illumination system. The area of the output surface, Area(out), of such an illumination system is typically much larger than the area of the input surface of the light transmitting means, Area(in), located adjacent to the light source. In addition, the output luminance, L(out), of the illumination system is much less than the intrinsic luminance, L(intrinsic), of the bare source. By bare source, we mean a light source that is operating with no other optical structures nearby which can perturb the output.

There are many applications, especially applications in which Area(out) is greater than Area(in), in which it would be desirable to have an illumination system that has an enhanced output luminance, L(out). In this invention, we will teach how to achieve an enhanced output luminance and show how, in some cases, to achieve an output luminance that is greater than the intrinsic luminance of the bare source.

SUMMARY OF THE INVENTION

The present invention is directed to an optical illumination system comprising: (1) a light source means having a reflective emitting surface and an intrinsic luminance, L(intrinsic); (2) a light transmitting means having a light input surface in close proximity to the light source means; (3) a light reflecting means separate from the light source means to reflect and recycle a portion of the light emitted from the light source means back to the light source means; and (4) a light extracting means comprising (a) a light input surface in optical contact with one surface of the light transmitting means whereby at least a portion of the light in the light transmitting means is extracted from the light transmitting means, (b) a light output surface through which the extracted light is directed, and, optionally, (c) a light collimating means interposed between and contiguous with the light input and the light output surfaces of the light extracting means whereby the output of the illumination system is more collimated than the input light to the light transmitting means. By recycling a portion of the light from the source back to the source, the light source will exhibit an enhanced luminance, L(enhanced), that is greater than L(intrinsic) of the bare source alone and, in addition, the output luminance, L(out), of the illumination system will be enhanced. However, this by itself does not necessarily mean that L(out) will be greater than L(intrinsic) of the bare source. Only under certain conditions which depend on the input area, Area(in), of the light transmitting means, the output area, Area(out), of the illumination system, the input light collimation or solid angle, $\Omega(in)$, at the input surface of the light transmitting means, and the output light collimation or solid angle, $\Omega(out)$, at the output surface of the illumination system, is it possible for the output luminance, L(out), of the system to be greater than the intrinsic luminance, L(intrinsic), of the bare light source means.

In one embodiment of this invention, a light source means with a reflecting emitting surface and an intrinsic luminance, L(intrinsic), is positioned adjacent to a light accepting surface of the light transmitting means. The light transmitting means may be any structure that transmits light. Optically coupled to one face of the light transmitting means is a light extracting means which extracts a portion of the light passing through the light transmitting means and directs the light to the output surface of the illumination system. A light reflecting means is positioned adjacent to a light accepting surface of the light transmitting means oppositely disposed from the light source means. At least a portion of the light from the light source means travels through the light transmitting means to the light reflecting means, is reflected back to the light source means and then reflects off the reflecting emitting surface of the light source means thereby enhancing the luminance of the light source means and enhancing the output luminance of the illumination system. By manipulation of Area(in), Area(out), $\Omega(in)$, and $\Omega(out)$, it is possible to achieve an output luminance for the illumination system that is greater than the intrinsic luminance of the light source means.

In another embodiment of this invention, two light source means, each having reflecting emitting surfaces and intrinsic luminances, L(intrinsic), are positioned adjacent to oppositely disposed light accepting surfaces of a light transmitting means. The light transmitting means may be any structure that transmits light. Optically coupled to one face of the light transmitting means is a light extracting means which extracts a portion of the light passing through the light transmitting means and directs the light to the output surface of the illumination system. The second light source means acts as the reflecting means to the first light source and vice versa. At least a portion of the light from the first light source means travels through the light transmitting means to a light reflecting means (the second light source means), is reflected back to the first light source means and then reflects off the reflecting emitting surface of the first light source means thereby enhancing the luminance of the first light source means and enhancing the output luminance of the illumination system. Similarly, at least a portion of the light from the second light source means travels through the light transmitting means to a light reflecting means (the first light source means), is reflected back to the second light source means and then reflects off the reflecting emitting surface of the second light source means thereby enhancing the luminance of the second light source means and enhancing the output luminance of the illumination system. By manipulation of Area(in), Area(out), $\Omega$(in), and $\Omega$(out), it is possible to achieve an output luminance for the illumination system that is greater than the intrinsic luminance of the light source means.

In another embodiment of this invention, a light source means with a reflecting emitting surface and an intrinsic luminance, L(intrinsic), is positioned adjacent to a light accepting surface of the light transmitting means. The light transmitting means may be any structure that transmits light. Optically coupled to one face of the light transmitting means is a light extracting means which extracts at least a portion of the light passing through the light transmitting means and directs the light to the output surface of the illumination system. A light reflecting means is positioned to partially surround the light source means. A portion of the light from the light source means is transmitted through the light transmitting means and light extraction means and exits the output surface of the illumination system. At least a portion of the light from the light source means travels to the light reflecting means, is reflected back to the light source means and then reflects off the reflecting emitting surface of the light source means thereby enhancing the luminance of the light source means and the output luminance of the illumination system. By manipulation of Area(in), Area(out), $\Omega$(in), $\Omega$(out), and the area of the light reflecting means, it is possible to achieve an output luminance for the illumination system that is greater than the intrinsic luminance of the light source means.

In another embodiment of this invention, a light source means with a reflecting emitting surface and an intrinsic luminance, L(intrinsic), is positioned in close proximity to a light accepting surface of the light transmitting means. The light transmitting means may be any structure that transmits light. Optically coupled to one face of the light transmitting means is a light extracting means which extracts at least a portion of the light passing through the light transmitting means and directs the light to the output surface of the illumination system. A light reflecting means is positioned between the light source means and the light accepting surface of the light transmitting means. In this example, the light reflecting means partially reflects a portion of the light impinging on the light reflecting means back to the light source means and transmits a another portion of the light from the light source means to the input surface of the light transmitting means. The portion of the light transmitted through the light reflecting means is furthermore transmitted through the light transmitting means and the light extraction means and exits the output surface of the illumination system. The portion of the light from the light source means that is reflected by the light reflecting means back to the light source means thereby enhances the luminance of the light source means and the output luminance of the illumination system. By manipulation of Area(in), Area(out), $\Omega$(in), and $\Omega$(out), it is possible to achieve an output luminance for the illumination system that is greater than the intrinsic luminance of the light source means.

Other configurations could utilize multiple light sources arranged to reflect light back upon each other. Further, single or multiple sources can be combined with reflectors that partially surround the sources to enhance the reflection capabilities of the illumination system.

The illumination systems described here have broad application in systems that utilize an illumination system. They can be used in direct illumination devices, projection display devices, flat panel displays for automotive instrument panels, games, broadcast television receivers, military, aerospace and avionics-related applications, computer monitors, and any other device that provides alphanumeric, numeric, data, or video information. Other applications include numerous types of residential, commercial and industrial lighting applications.

BRIEF DESCRIPTION OF DRAWINGS

A more complete understanding of the present invention, as well as other objects and advantages thereof not enumerated herein, will become apparent upon consideration of the following detailed description and the accompanying drawings, wherein.

DETAILED DESCRIPTION OF THE PREFERRED EMBODIMENTS

The preferred embodiments of the present invention will be better understood by those skilled in the art by reference to the above figures. The preferred embodiments of this invention illustrated in the figures are not intended to be exhaustive or to limit the invention to the precise form disclosed. They are chosen to describe or to best explain the principles of the invention and its applicable and practical use to thereby enable others skilled in the art to best utilize the invention.

Figure 1:
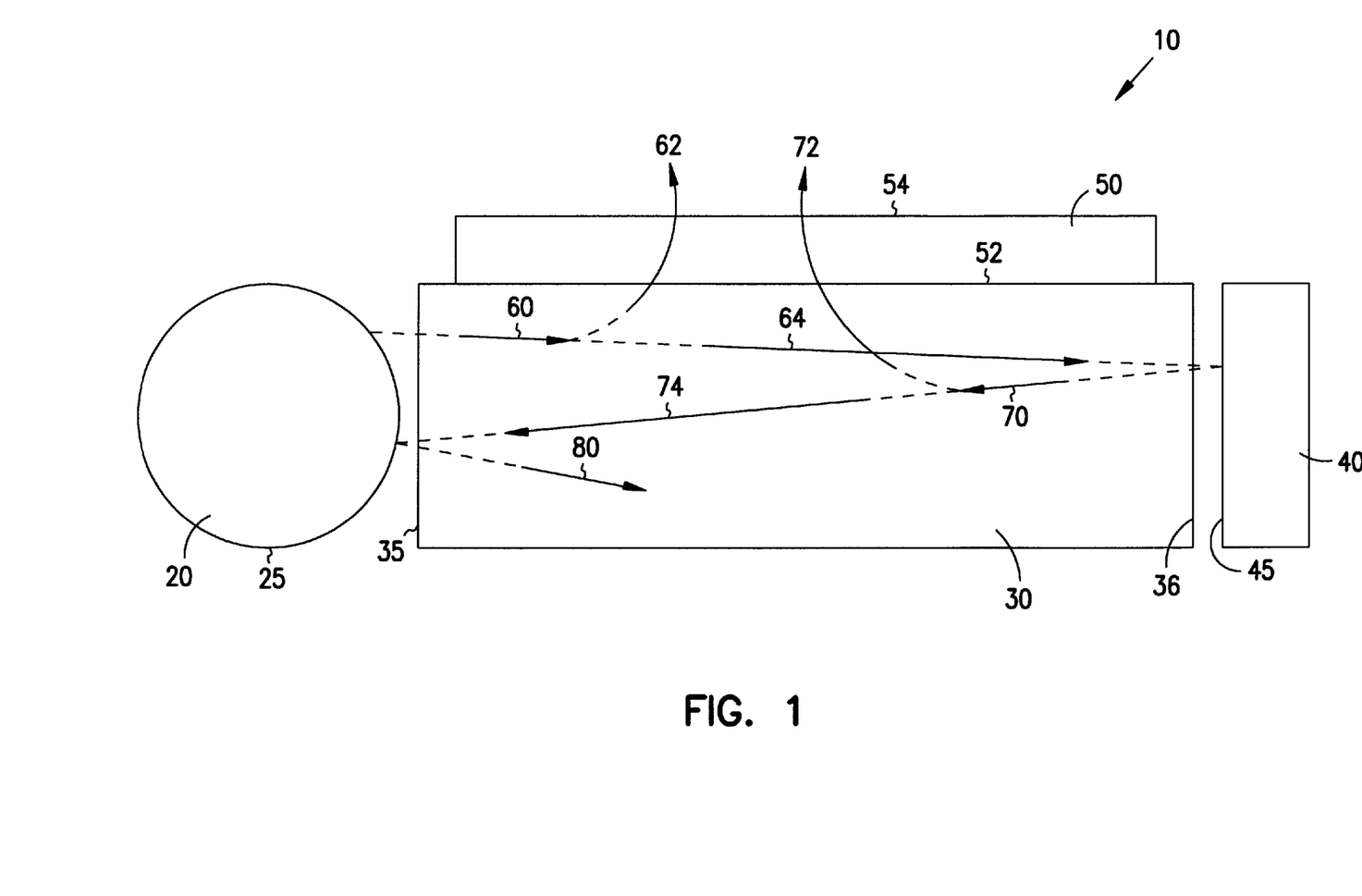
FIG. 1 is a cross-sectional diagram of an illumination system comprising a single light source means having a reflective emitting surface and an opposing reflector.

One embodiment of this invention is an illumination system 10 as shown in the cross-sectional diagram of FIG. 1. It should be appreciated that this drawing is merely a representation of the structure; the actual and relative dimensions will be different. The illumination system 10 has a light source means 20 with a reflecting emitting surface 25. Examples of light source means that have a reflective emitting surface include, but are not limited to, fluorescent lamps, cathode luminescent phosphor lamps, single crystal phosphor lamps, thin film phosphor sources, light emitting diodes (LED), organic light emitting diodes, electroluminescent thin film sources, electroluminescent thick film sources, gray body radiators such as incandescent sources, and plasma discharge sources. Preferred light sources are fluorescent lamps and light emitting diodes.

The light transmitting means 30 may be any structure that transmits light. Light transmitting means include, but are not limited to, structures that transmit light via reflection, such as a waveguides, light pipes, light wedges, hollow waveguides partially surrounded by reflectors, or any other structure known to those skilled in the art. Preferably the light transmitting means 30 is a waveguide which has an input surface 35 that accepts light from light source means 20. Through total internal reflection (TIR), the waveguide 30 causes the light rays generated by the light source 20 to substantially reflect within the waveguide 30. A light reflecting means 40 with reflecting surface 45 is positioned at the opposing end of waveguide 30 relative to the light source means 20. The light reflecting means may be any surface that reflects at least a portion of the light incident on the surface. The surface may have specular (mirror) or diffuse reflectivity and may be flat, faceted, or curved.

A light extracting means 50 is in optical contact with waveguide 30 and has an input surface 52 and output surface 54. Light extracting means 50 extracts a portion of the light flux passing through waveguide 30. The extracted light passes through the input surface 52 and out the output surface 54 of light extracting means 50. Output surface 54 of light extracting means 50 is also the output surface for the illumination system 10. The light extracting means 50 may be any optical structure, such as a simple lens, prism, a rough area on a surface, or any other structure known to those skilled in the art, that can be placed in optical contact with the light transmitting means and which removes at least a portion of the light from the light transmitting means.

If the output surface area of the illumination system is greater than the input surface area of the light transmitting means, preferably the light extracting means 50 also includes a light collimating means. Examples of light collimating means are disclosed in U.S. Pat. No. 5,396,350, issued Mar. 7, 1995, to Beeson et al. for a Backlighting Apparatus Employing an Array of Microprisms, U.S. Pat. No. 5,428,468, issued Jun. 27, 1995, to Zimmerman et al. for an Illumination System Employing an Array of Microprisms, and U.S. Pat. No. 5,521,725, issued May 28, 1996, to Beeson et al. for an Illumination System Employing an Array of Microprisms, all of which are incorporated herein by reference. One example of a light collimating means is an array of microprisms wherein each microprism comprises: (i) a light input surface optically coupled to the light transmitting means, (ii) a light output surface distal from the light input surface, (iii) a first sidewall disposed between and contiguous with the light input surface and the light output surface and forming a tilt angle with respect to the normal of the surface of the light transmitting means. As a second example, the light extracting means 50 may be used in conjunction with a low index of refraction layer disposed between the light transmitting means 30 and the light extracting means 50. This low index of refraction layer serves to partially collimate the output light of the illumination system by allowing only a selected portion of the initial light angular distribution to emerge from the output of the system. As a further option, an array of microlenses may be used in conjunction with the array of microprisms such that the output of each microprism is directed to at least one corresponding microlens. Other types of light collimating means known to those skilled in the art may also be utilized for this invention.

In order to better understand how illumination system 10 functions, some representative arrows are shown in FIG. 1 which represent a sequence of events that may occur to some of the light within illumination system 10. These arrows are shown for illustrative purposes only are not meant to imply that all the light will undergo the same sequence of events. At the beginning of the sequence, light is emitted by surface 25 of light source means 20. In addition to being an emitting surface, this surface is also a reflective surface having a reflectivity of r(1). The intrinsic luminance or brightness of light source means 20, measured with no other optical structures in the vicinity of light source means 20, is L(intrinsic). Some of the light enters waveguide 30 at the waveguide input surface 35 which has surface area, Area (in). The luminance of the light at the input surface 35 is L(in). The solid angle distribution (in air) of the light passing into input surface 35 is $\Omega(in)$. The light flux that has entered waveguide 30 is denoted by arrow 60. A fraction [x] of the light 60, denoted by arrow 62, will be extracted by light extraction means 50 and will emerge from the illumination system 10 through output surface 54. The value of [x] can range from 0 to 1. It is preferred that [x] be between 0.01 and 0.80. It is more preferred that [x] be between 0.01 and 0.60. It is most preferred that [x] be between 0.01 and 0.40. The solid angle distribution (in air) of the light emerging from the output surface 54 is $\Omega(out)$ and the area of output surface 54 is Area(out). The remaining fraction [1−x] of the light 60, denoted by arrow 64, will continue through waveguide 30 by TIR and exit waveguide 30 at surface 36. Some of light 64 will be reflected by reflecting surface 45 of reflector 40 and reenter waveguide 30 at surface 36. The reflectivity of reflecting surface 45 is r(2). The fraction of the initial light 60 that reenters waveguide 30 is [1−x][r(2)] and is denoted by arrow 70. A fraction [x] of light 70, or equivalently a fraction [x][1−x][r(2)] of the initial light 60, will be extracted by extraction means 50 and will emerge from the illumination system 10 through output surface 54 (shown as arrow 72) with solid angle distribution $\Omega(out)$. The remaining fraction [1−x] of light 70 (denoted by arrow 74), or equivalently fraction [1−x][1−x][r(2)] of the initial light 60, will be recycled back to the light source means 20 after one round trip. The fraction of the initial light 60 that is recycled back to the light source means 20 after one round trip from the light source means 20 to reflector 40 and back to light source means 20 is denoted by R, where the magnitude of R is given by $$R=[1-x][1-x][r(2)]. \tag{1}$$

Since the emitting surface 25 of light source means 20 is reflective with reflectivity r(1), some fraction of light 74 equal to [r(1)R] will be reflected back into the waveguide 30 and is denoted by arrow 80. The luminance of the light source will be enhanced by the reflected light. The enhanced luminance, L(enhanced), that results from one round trip of the light from the light source means 20 to reflector 40 and back to light source means 20 is given by $$L(\text{enhanced})=[L(\text{intrinsic})][1+r(1)R], \tag{2}$$

where r(1) is the reflectivity of light source means 20 and R is given by equation (1). Light 80 that has been reflected back into waveguide 30 can repeat the same sequence of events as the initial light 60. A portion of light 80 can be reflected back to the light source means 20 and result in additional enhancement of the source luminance. After the second round trip of the light remaining from the initial light 60, the luminance of the source becomes $$L(\text{enhanced}) = [L(\text{intrinsic})][1 + r(1)R + [r(1)R]^2]. \quad (3)$$

This sequence of events can occur many times. Equation (3) then becomes an infinite geometric series where each term of the series is calculated by taking the preceding term of the series and multiplying it by the factor $[r(1)R]$. The sum of a geometric series is given by a simple mathematical expression. For the above example, the enhanced luminance that results when a portion of the initial light 60 makes a very large number of round trips from the light source means 20 to the reflector 40 and back to light source means 20 is given by $$L(\text{enhanced}) = [L(\text{intrinsic})]\{1/[1 - r(1)R]\}. \quad (4)$$

In equation (4), the value of r(1), the reflectivity of the emitting surface 25, is a number between 0 and 1. The fraction of the light recycled, R, is also a number between 0 and 1. Therefore the product, r(1)R, of the two numbers is also a number between 0 and 1. One can see how the reflectivity r(1) and the fraction of light recycled, R, affect the enhancement of the luminance by substituting specific values for r(1) and R into equation (4). For example, if r(1)=0.9 (a relatively high number) and the recycling R=0.1, the enhanced luminance is only 1.10 times the intrinsic luminance. If r(1)=0.9 and R=0.5, the enhanced luminance is 1.82 times the intrinsic luminance. If r(1)=0.9 and R=0.9, the enhanced luminance is 5.26 times the intrinsic luminance. In order to get a significant enhancement to the luminance of the source, it is preferred that the reflectivity of the light source be between 0.5 and 1.0. It is more preferred that the reflectivity of the light source be between 0.7 and 1.0. It is most preferred that the reflectivity of the light source be between 0.9 and 1.0. In order have any enhancement of the light source luminance, there must be a non-zero fraction R of the light emitted by the light source that is recycled back to the source. It is preferred that the fraction R of the light recycled be between 0.10 and 0.99. It is more preferred that the fraction R of the light recycled be between 0.25 and 0.99. It is most preferred that the fraction R of the light recycled be between 0.40 and 0.99.

As stated previously, even if some of the light emitted by the source is recycled back to the source resulting in a source with enhanced luminance, L(enhanced), where L(enhanced) is greater than the intrinsic source luminance, L(intrinsic), it does not necessarily follow that the output luminance, L(out), of the illumination system 10 will be greater than L(intrinsic). The magnitude of L(out) is strongly dependent on (a) the input area, Area(in), of the surface of the light transmitting means adjacent to the light source means, (b) the output area, Area(out), of the output surface of the illumination system, (c) the input light collimation or solid angle, $\Omega(\text{in})$, at the input surface, and (d) the output light collimation or solid angle, $\Omega(\text{out})$, at the output surface of the illumination system. In all cases, the maximum value that L(out) can have is L(enhanced). As an illustrative example, for an illumination system in which some of the light is recycled back to the source, assume that the angular distribution of the light at the input surface of the light transmitting means and the angular distribution of the light at the output of the illumination system are both equal $[\Omega(\text{in}) = \Omega(\text{out})]$. If the area of the input surface of the light transmitting means, Area(in), is equal to the output area of the illumination system, Area(out), and there are no light losses in the system, then L(out) will equal L(enhanced) and the system output luminance, L(out), will be greater than the intrinsic luminance of the source, L(intrinsic).

In most practical illumination systems, Area(out) is much larger than Area(in). In this latter example, it is possible for the illumination system to have an output luminance greater than the intrinsic luminance of the source only if the light extracting means 50 includes a light collimating means such that the solid angle subtended by the light output distribution, $\Omega(\text{out})$, is less than the solid angle subtended by the light input light distribution, $\Omega(\text{in})$, (i.e. the light output distribution is more collimated than the light input distribution). If we assume for simplicity that the input and output distributions are either Lambertian or truncated Lambertian distributions and we assume that the system is lossless and in equilibrium, then conservation of flux results in $$[L(\text{out})][\text{Area(out)}][\Omega(\text{out})][L(\text{enhanced})][\text{Area(in)}][\Omega(\text{in})]. \quad (5)$$

By Lambertian, we mean that the light distribution has the same luminance or brightness when viewed from any angle. A truncated Lambertian distribution is a distribution that is Lambertian out to some cutoff angle and then is zero after the cutoff. Solving for L(out) gives $$[L(\text{out})] = \{[L(\text{enhanced})][\text{Area(in)}][\Omega(\text{in})]\}/\{[\text{Area(out)}][\Omega(\text{out})]\} \quad (6)$$

From equation (6), the maximum value L(out)=L(enhanced) can be achieved if the light output distribution is more collimated than the light input distribution and the light output collimation is given by $$\Omega(\text{out}) = \{[\text{Area(in)}][\Omega(\text{in})]\}/[\text{Area(out)}]. \quad (7)$$

The above examples were expressed in a simplified manner assuming lossless systems in order to illustrate the concepts. In actual situations, as will be understood by someone skilled in the art, light losses due to such things as scattering or absorption will complicate the mathematical analyses and equations (5)–(7) will need to be modified.

Figure 2:
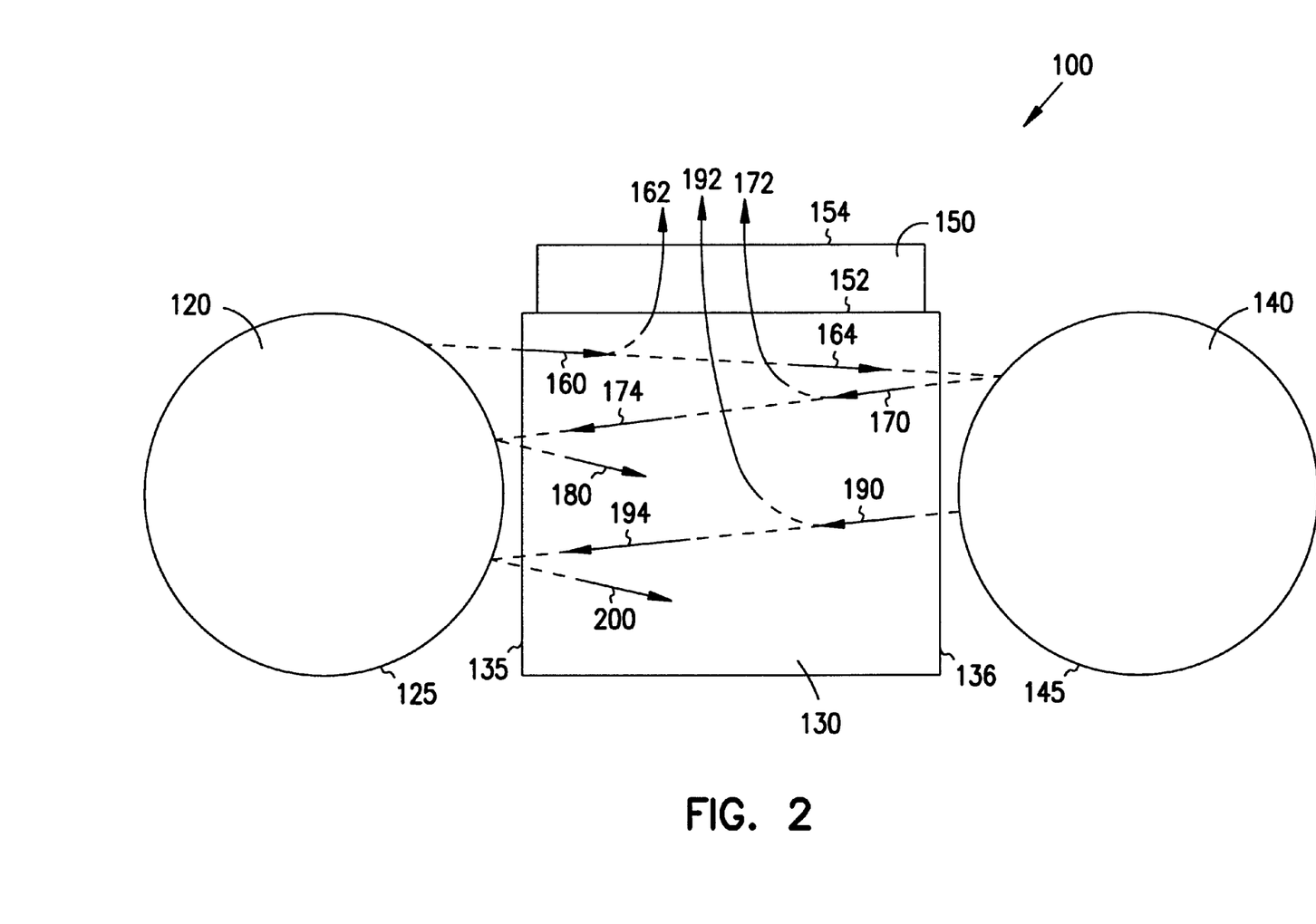
FIG. 2 is a cross-sectional diagram of an illumination system having two reflective emitting light source means.

Another embodiment of this invention is an illumination system 100 as shown in the cross-sectional diagram of FIG. 2. This embodiment has two light sources means, each having a reflective surface. It should be appreciated that this drawing is merely a representation of the structure; the actual and relative dimensions will be different. The illumination system 100 has a light source means 120 with a reflecting emitting surface 125. Light transmitting means 130 is, for example, a waveguide which has an input surface 135 that accepts light from light source means 120. Other examples of light transmitting means were discussed in the first embodiment. Through total internal reflection (TIR), the waveguide 130 causes the light rays generated by the light source means 120 to substantially reflect within the waveguide 130. An additional light source means 140 with reflecting surface 145 can be used as both a light source and a reflector and is positioned a the opposing end of waveguide 130 relative to the light source means 120. A light extracting means 150 is in optical contact with waveguide 130 and has an input surface 152 and output surface 154. Light extracting means 150 extracts a portion of the light flux passing through waveguide 130. The extracted light passes through the input surface 152 and out the output surface 154 of light extracting means 150. Output surface 154 of light extracting means 150 is also the output surface for the illumination system 100.

In order to understand how illumination system 100 functions, some representative arrows are shown in FIG. 2 which represent a sequence of events that may occur to some of the light within illumination system 100. These arrows are shown for illustrative purposes only are not meant to imply that all the light will undergo the same sequence of events. Looking first at light source means 120, at the beginning of the sequence, light is emitted by surface 125 of light source means 120. In addition to being an emitting surface, this surface is also a reflective surface having a reflectivity of r(1). The intrinsic luminance or brightness of light source means 120, measured with no other optical structures in the vicinity of light source means 120, is L(intrinsic). Some of the light from light source means 120 enters waveguide 130 at the waveguide input surface 135 which has surface area, Area(in). The luminance of the light at the input surface 135 is L(in). The solid angle distribution (in air) of the light passing into input surface 135 is $\Omega$(in). The light flux that has entered waveguide 130 is denoted by arrow 160. A fraction [x'] of the light 160, denoted by arrow 162, will be extracted by light extraction means 150 and will emerge from the illumination system 100 through output surface 154. The value of [x'] can range from 0 to 1. It is preferred that [x'] be between 0.01 and 0.80. It is more preferred that [x'] be between 0.01 and 0.60. It is most preferred that [x'] be between 0.01 and 0.40. The solid angle distribution (in air) of the light emerging from the output surface 154 is $\Omega$(out) and the area of output surface 154 is Area(out). The remaining fraction [1−x'] of the light 160, denoted by arrow 164, will continue through waveguide 130 by TIR and exit waveguide 130 at surface 136. Some of light 164 will be reflected by reflecting surface 145 of light source means 140 and reenter waveguide 130 at surface 136. The reflectivity of the reflecting surface 145 of light source means 140 is r(2). The fraction of the initial light 160 that reenters waveguide 130 is [1−x'][r(2)] and is denoted by arrow 170. A fraction [x'] of light 170, or equivalently a fraction [x'][1−x'][r(2)] of the initial light 160, will be extracted by light extraction means 150 and will emerge from the illumination system 100 through output surface 154 (shown as arrow 172) with solid angle distribution $\Omega$(out). The remaining fraction [1−x'] of light 170, or equivalently fraction [1−x'][1−x'][r(2)] of the initial light 160 (denoted by arrow 174), will be recycled back to the light source means 120 after one round trip. The fraction of the initial light 160 that is recycled back to the light source means 120 after one round trip from the light source means 120 to light source means 140 and back to light source means 120 is denoted by R', where the magnitude of R' is given by $$R'=[1-x'][1-x'][r(2)]. \tag{8}$$

Since the emitting surface 125 of light source means 120 is reflective with reflectivity r(1), some fraction of light 174 equal to [r(1)R'] will be reflected back into the waveguide 130 and is denoted by arrow 180. The luminance of the light source will be enhanced by the reflected light. The enhanced luminance, L(enhanced), that results from one round trip of the light from the light source means 120 to light source means 140 and back to light source means 120 is given by $$L(\text{enhanced})=[L(\text{intrinsic})][1+r(1)R']. \tag{9}$$

where r(1) is the reflectivity of light source means 120 and R' is given by equation (8). Light 180 that has been reflected back into waveguide 130 can repeat the same sequence of events as the initial light 160. A portion of light 180 can be reflected back to the light source means 120 and result in additional enhancement of the source luminance. After the second round trip of the light remaining from the initial light 160, the luminance of the source becomes $$L(\text{enhanced})=[L(\text{intrinsic})][1+r(1)R'+[r(1)R']^2]. \tag{10}$$

This sequence of events can occur many times. Equation (10) then becomes an infinite geometric series where each term of the series is calculated by taking the preceding term of the series and multiplying it by the factor [r(1)R']. The sum of a geometric series is given by a simple mathematical expression. For the above example, the enhanced luminance that results when a portion of the initial light 160 makes a very large number of round trips from the light source means 120 to the light source means 140 and back to light source means 120 is given by $$L(\text{enhanced})=[L(\text{intrinsic})]\{1/[1-r(1)R']\}. \tag{11}$$

Equation (11) is an expression for the enhanced luminance of light source means 120 due to light emitting by light source means 120 being recycled back to light source means 120.

Equation (11) does not include an additional enhancement to the luminance of light source means 120 due to light emitted by light source means 140. This additional enhancement is also illustrated in FIG. 2. At the beginning of this second sequence of events as shown in FIG. 2, light is emitted by surface 145 of light source means 140. As stated previously surface 145 has a reflectivity of r(2). The intrinsic luminance or brightness of light source means 140, measured with no other optical structures in the vicinity of light source means 140, is assumed, or simplicity, to be the same as the luminance of light source means 120 or L(intrinsic). For simplicity, it is also assumed that the values of L(in), Area(in), and $\Omega$(in) for light source means 140 are equal to the equivalent values for light source means 120. As known to those skilled in the art, it is not necessary that the these values for light source means 140 and 120 be equal. Some of the light from light source means 140 enters waveguide 130 at the waveguide at surface 136 which has surface area, Area(in). The luminance of the light at the input surface 136 is L(in). The solid angle distribution (in air) of the light passing into input surface 136 is $\Omega$(in). The light flux that has entered waveguide 130 is denoted by arrow 190. A fraction [x'] of the light 190, denoted by arrow 192, will be extracted by light extraction means 150 and will emerge from the illumination system 100 through output surface 154. The solid angle distribution (in air) of the light emerging from the output surface 154 is $\Omega$(out) and the area of output surface 154 is Area(out). The remaining fraction [1−x'] of the light 190, denoted by arrow 194, will continue through waveguide 130 by TIR and exit waveguide 130 at surface 135. Some of light 194 will be reflected by reflecting surface 125 of light source means 120 and reenter waveguide 130 at surface 135. The reflectivity of the reflecting surface 125 of light source means 120 is r(1). The fraction of the initial light 190 that reenters waveguide 130 is [1−x'][r(1)] and is denoted by arrow 200. This light will add to the surface luminance of light source means 120. This additional light 200 reflected from light source means 120 will then cycle through the same sequence of events as light 160. The resulting enhanced brightness, L(enhanced), of light source means 120 is the sum of the effects of recycling light emitted from light source means 120 back to light source means 120 plus the effects of reflecting and recycling light originally emitted by light source means 140 back to light source means 120. The total enhanced brightness, L(enhanced), due to both light sources is given by $$L(\text{enhanced}) = [L(\text{intrinsic})]\{1 + [1 - x'][r(1)]\}\{1/[1 - r(1)R']\}. \quad (12)$$

The relationship given by equation (12) is similar to equation (11) but with an additional term due to light being emitted from source means 140. The luminance of light source means 140 will undergo a similar enhancement due to light from light source means 140 being recycled back to light source means 140 and light from light source means 120 reflecting off light source means 140. In equation (14), [x'] is the fraction of light in waveguide 130 that is extracted by light extraction means 150 in one pass of the light through waveguide 130. The value of [x'] can range from 0 to 1. Preferably the value of [x'] is between 0.01 and 0.80. More preferably, the value of [x'] is between 0.01 and 0.60. Most preferably, the value of [x'] is between 0.01 and 0.40. In order to get a significant enhancement to the luminance of the source, it is preferred that the reflectivity of the light source means 120 and 140 be between 0.5 and 1.0. It is more preferred that the reflectivity of the light source means 120 and 140 be between 0.7 and 1.0. It is most preferred that the reflectivity of the light source means 120 and 140 be between 0.9 and 1.0. In order have any enhancement of the light source luminance, there must be a non-zero fraction R' of the light emitted by the light sources that is recycled back to the source. It is preferred that the fraction R' of the light recycled be between 0.10 and 0.99. It is more preferred that the fraction R' of the light recycled be between 0.25 and 0.99. It is most preferred that the fraction R' of the light recycled be between 0.40 and 0.99.

In the example shown in FIG. 2, even if some of the light emitted by the two light source means is recycled back to the sources resulting in sources with enhanced luminance, it does not necessarily follow that the output luminance of the illumination system 100 will be greater than the intrinsic luminance of the sources. As in FIG. 1, the parameters Area(in), Area(out), Ω(in) and Ω(out) are also important. The calculations of the relationships between output luminance and these parameters are similar to the calculations shown in equations (5)–(7). In many practical applications, Area(out) is much larger than the Area(in) for each light source. In such a case, the light extracting means may need to include a light collimating means in order to achieve a situation where L(out) is greater than L(intrinsic). Examples of light collimating means are given above in the first embodiment related to FIG. 1.

Figure 3:
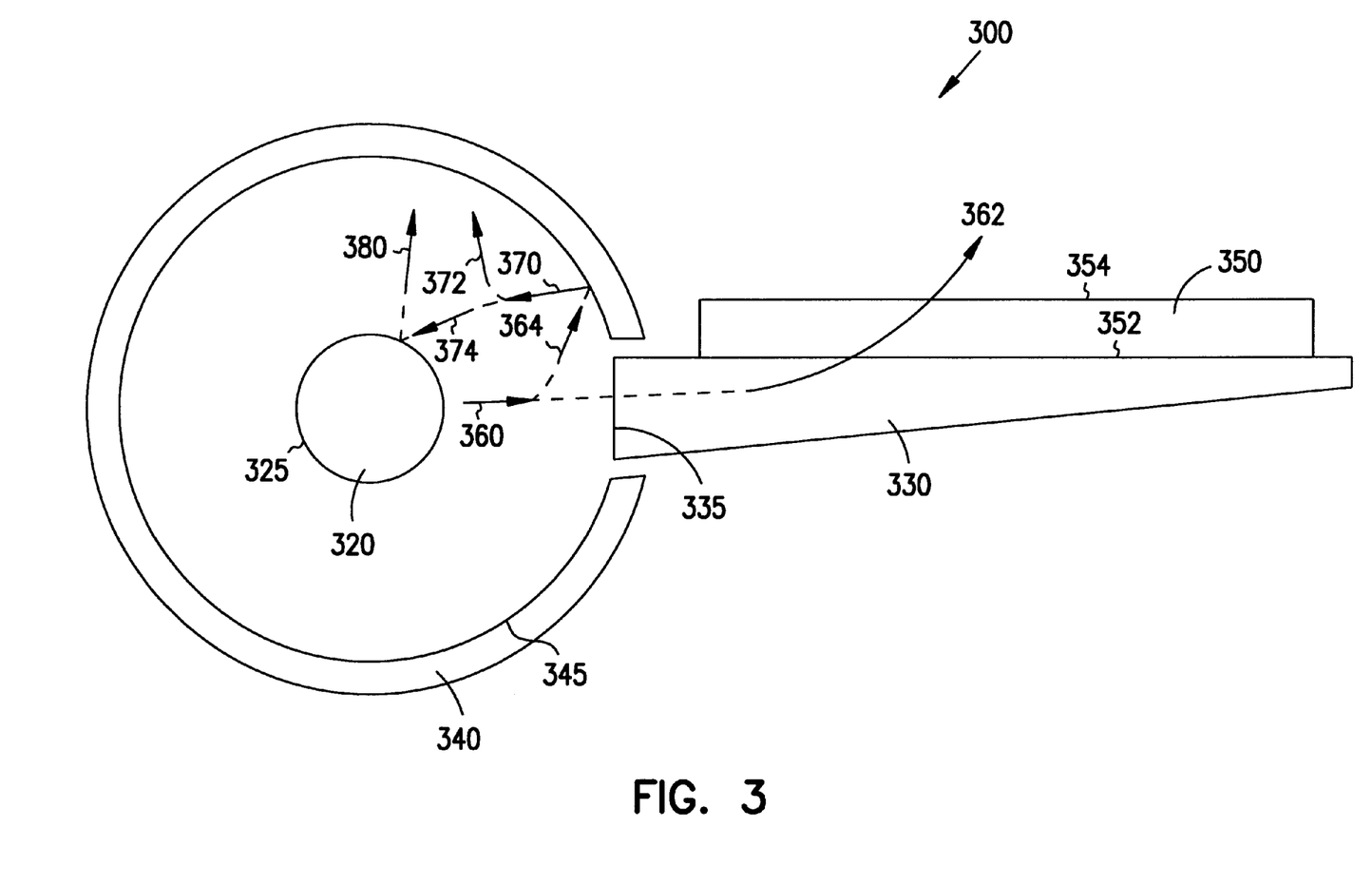
FIG. 3 is a cross-sectional diagram of an illumination system having one light source means with a surrounding reflector.

Another embodiment of this invention is an illumination system 300 as shown in the cross-sectional diagram of FIG. 3. This embodiment has one light source means that has a reflecting emitting surface. This light source means is partially surrounded by a reflecting means having a reflective surface. It should be appreciated that this drawing is merely a representation of the structure; the actual and relative dimensions will be different. The illumination system 300 has a light source means 320 with a reflecting emitting surface 325. Light source means 320 is partially surrounded by a reflecting means 340 with light reflecting surface 345. Light transmitting means 330 is, for example, a tapered waveguide which has an input surface 335 that accepts light from light source means 320. Other examples of light transmitting means are given in the first embodiment. Through total internal reflection (TIR), the waveguide 330 causes the light rays generated by the light source means 320 to substantially reflect within the waveguide 330. A light extracting means 350 is in optical contact with waveguide 330 and has an input surface 352 and output surface 354. Light extracting means 350 extracts at least a portion of the light flux passing through waveguide 330. The extracted light passes through the input surface 352 and out the output surface 354 of light extracting means 350. Output surface 354 of light extracting means 350 is also the output surface for the illumination system 300.

In order to understand how illumination system 300 functions, some representative arrows are shown in FIG. 3 which represent a sequence of events that may occur to some of the light within illumination system 300. These arrows are shown for illustrative purposes only are not meant to imply that all the light will undergo the same sequence of events. Looking first at light source means 320, at the beginning of the sequence, light is emitted by surface 325 of light source means 320. This light is denoted by arrow 360 in FIG. 3. In addition to being an emitting surface, this surface is also a reflector having a reflectivity of r(1). The intrinsic luminance or brightness of light source means 320, measured with no other optical structures in the vicinity of light source means 320, is L(intrinsic). Some fraction [x"] of the light from light source means 320 enters waveguide 330 at the waveguide input surface 335 which has surface area, Area(in). The value of [x"] can range from 0 to 1. It is preferred that [x"] be between 0.01 and 0.80. It is more preferred that [x"] be between 0.01 and 0.60. It is most preferred that [x"] be between 0.01 and 0.40. The luminance of the light at the input surface 335 is L(in). The solid angle distribution (in air) of the light passing into input surface 335 is Ω(in). The light flux [x"] that has entered waveguide 330 is denoted by arrow 362. At least a portion or all of the light entering waveguide 330 and denoted by arrow 362 will be extracted by light extraction means 350 and will emerge from the illumination system 300 through output surface 354. The solid angle distribution (in air) of the light emerging from the output surface 354 is Ω(out) and the area of output surface 354 is Area(out). The remaining fraction [1−x"] of the light 360, denoted by arrow 364, will travel to reflecting means 340. The reflectivity of the reflecting surface 345 of reflecting means 340 is r(2). The fraction of the initial light 360 that is reflected from reflecting surface 345 is [1−x"][r(2)] and is denoted by arrow 370. A fraction [y] of light 370, or equivalently a fraction [y][1−x"][r(2)] of the initial light 360, will be recycled back to light source means 320 and is denoted by arrow 374. The value of [y] can range from 0 to 1. It is preferred that the value of [y] be between 0.10 and 0.99. It is more preferred that the value of [y] be between 0.20 and 0.99. It is most preferred that the value of [y] be between 0.3 and 0.99. The light 374 that is recycled back to the light source means 320 after one round trip from the light source means 320 to reflecting means 340 and back to light source means 320 is denoted by R", where the magnitude of R" is given by $$R'' = [y][1 - x''][r(2)]. \quad (13)$$

The remaining fraction [1−y] of light 370, or equivalently fraction [1−y][1−x"][r(2)] of the initial light 360, will travel to another portion of reflecting means 340 and is denoted by arrow 372. Since the emitting surface 325 of light source means 320 is reflective with reflectivity r(1), some fraction of light 374 equal to [r(1)R"] will be reflected from surface 325 and is denoted by arrow 380. The luminance of the light source means will be enhanced by the reflected light. The enhanced luminance, L(enhanced), that results from one round trip of the light from the light source means 320 to reflecting means 340 and back to light source means 320 is given by $$L(\text{enhanced}) = [L(\text{intrinsic})][1 + r(1)R''], \quad (14)$$

where r(1) is the reflectivity of light source means 320 and R" is given by equation (13). Light 380 that has been reflected from surface 325 can repeat the same sequence of events as the initial light 360. A portion of light 380 can be reflected back to the light source means 320 and result in additional enhancement of the source luminance. After the second round trip of the light remaining from the initial light 360, the luminance of the source becomes $$L(\text{enhanced}) = [L(\text{intrinsic})][1 + r(1)R'' + [r(1)R'']^2]. \quad (15)$$

This sequence of events can occur many times. Equation (15) then becomes an infinite geometric series where each term of the series is calculated by taking the preceding term of the series and multiplying it by the factor [r(1)R"] where R" is given by equation (13). The sum of a geometric series is given by a simple mathematical expression. For the above example, the enhanced luminance that results when a portion of the initial light 360 makes a very large number of round trips from the light source means 320 to the reflecting means 340 and back to light source means 320 is given by $$L(\text{enhanced}) = [L(\text{intrinsic})]\{1/[1 - r(1)R'']\}. \quad (16)$$

Equation (16) is an expression for the enhanced luminance of light source means 320 due to light emitting by light source means 320 being recycled back to light source means 320. In order to get a significant enhancement to the luminance of the source, it is preferred that the reflectivity r(1) of light source means 320 be between 0.5 and 1.0. It is more preferred that the reflectivity of light source means 320 be between 0.7 and 1.0. It is most preferred that the reflectivity of light source means 320 be between 0.9 and 1.0. In order have any enhancement of the light source luminance, there must be a non-zero fraction R" of the light emitted by the light sources that is recycled back to the source. It is preferred that the fraction R" (given by equation (13)) of the light recycled be between 0.10 and 0.99. It is more preferred that the fraction R" of the light recycled be between 0.25 and 0.99. It is most preferred that the fraction R" of the light recycled be between 0.40 and 0.99.

In the example shown in FIG. 3, even if some of the light emitted by the source is recycled back to the source resulting in a source with enhanced luminance, it does not necessarily follow that the output luminance of the illumination system 300 will be greater than the intrinsic luminance of the source. As in FIG. 1, the parameters Area(in), Area(out), Ω(in) and Ω(out) are also important. The calculations of the relationships between output luminance and these parameters are similar to the calculations shown in equations (5)–(7). In many practical applications, Area(out) is much larger than the Area(in) of each light source. In such a case, the light extracting means may need to include a light collimating means in order to achieve a situation where L(out) is greater than L(intrinsic). Examples of light collimating means are given above in the first embodiment related to FIG. 1.

Figure 4:
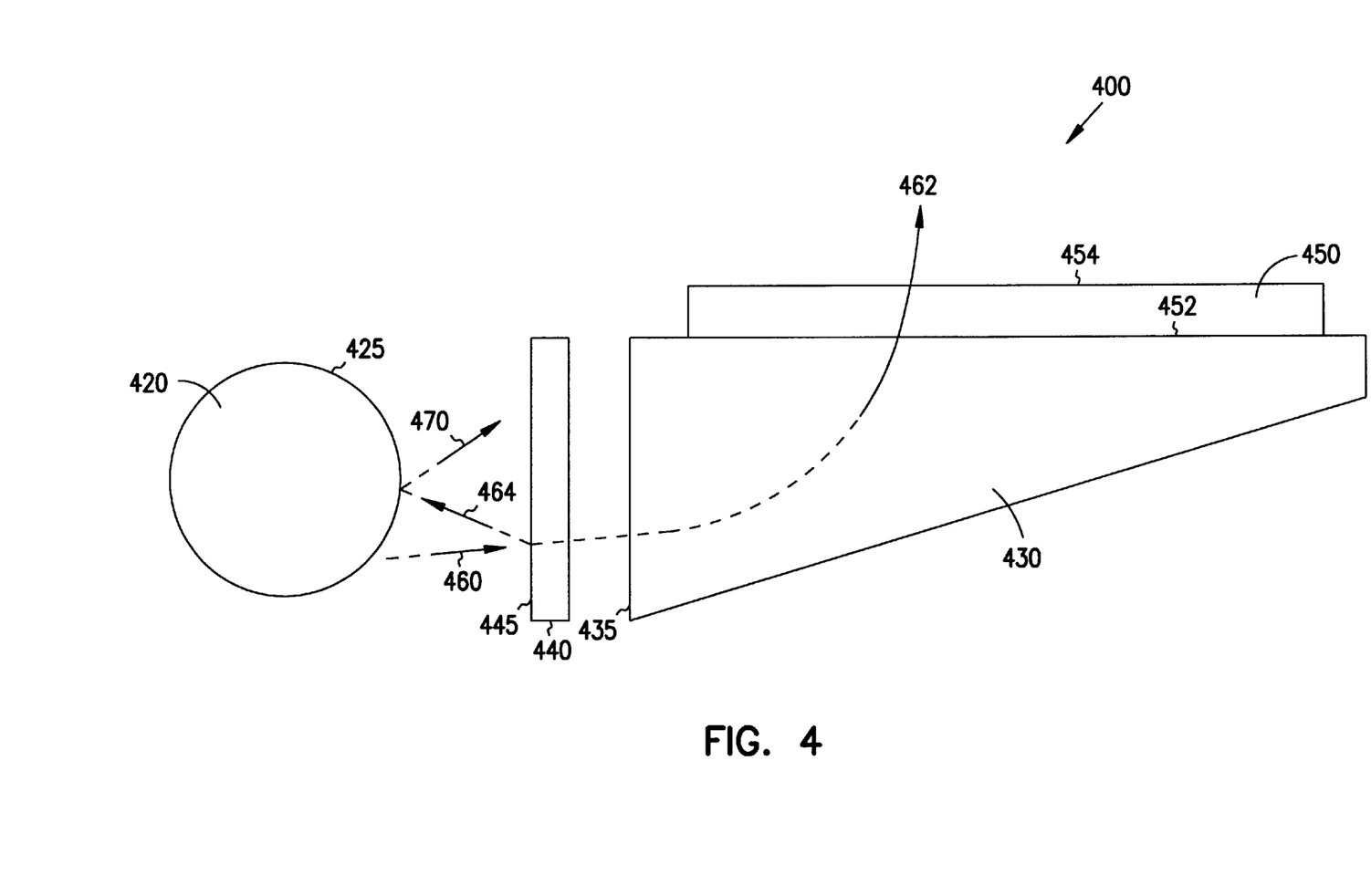
FIG. 4 is a cross-sectional diagram of an illumination system having a reflecting means situated between the light source means and the light transmitting means.

Another embodiment of this invention is an illumination system 400 as shown in the cross-sectional diagram of FIG. 4. This embodiment has one light source means that has a reflecting emitting surface. It should be appreciated that this drawing is merely a representation of the structure; the actual and relative dimensions will be different. The illumination system 400 has a light source means 420 with a reflecting emitting surface 425. Light reflecting means 440 is located between light source means 420 and light transmitting means 430. Light reflecting means 440 is any partially reflecting optical component or structure that selectively reflects a portion of the area or a portion of the angular distribution of the light from light source means 420 back to light source means 420 and transmits another portion of the light from light source means 420 to the light transmitting means 430. Examples of light reflecting means 440 include, but are not limited to, an array of lenticular prisms, an array of tapered optical waveguides, an array of lenticular tapered optical waveguides or a combination of these elements.

Figure 5:
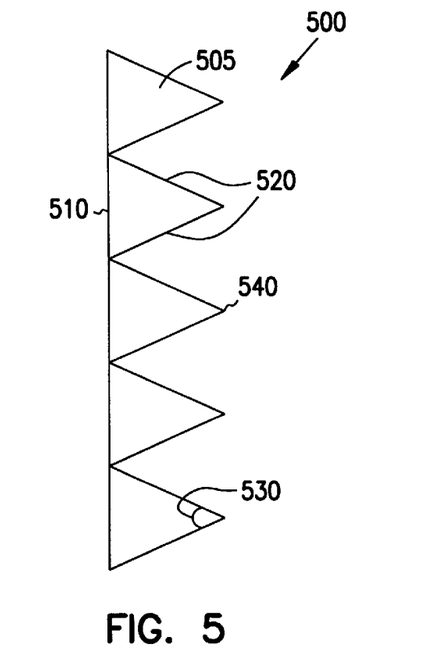
FIG. 5 is a cross-sectional diagram of a reflecting means that can be used with the illumination system of FIG. 4.
Figure 6:
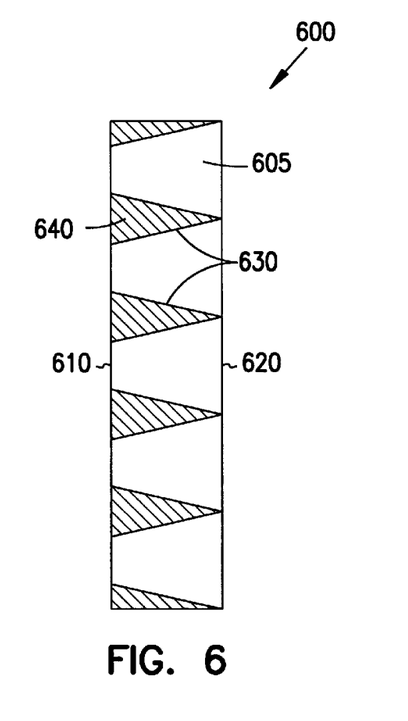
FIG. 6 is a cross-sectional diagram of another reflecting means that can be used with the illumination system of FIG. 4.

Examples of light reflecting means 440 are shown in FIGS. 5 and 6. FIG. 5 shows an array 500 of lenticular prisms 505 which can be used as a light reflecting means in FIG. 4. The shape and length of the prism sides 520, the prism angle 530, and the orientation of the prisms 505 can vary. It is preferred that flat surface 510 be oriented to be adjacent to the light source means 420 (FIG. 4) and that the points 540 of the prisms 505 be oriented to be adjacent to input surface 435 of light transmitting means 430. It is preferred that the prism angle 530 be in the range from 5 degrees to 170 degrees. It is more preferred that the prism angle be in the range from 80 degrees to 130 degrees. FIG. 6 shows an array 600 of tapered optical waveguides 605 which can be used as a light reflecting means in FIG. 4. The tapered optical waveguides 605 have input surfaces 610, output surfaces 620, and sidewalls 630. The cross-section of each tapered waveguide 605 can be any shape including, but not limited to, a square, a rectangle of any dimension, a polygon, a circle, or an ellipse. The tapered waveguides 605 can also be lenticular tapered waveguides. The sides 630 of the tapered waveguides 605 can be straight, curved, or faceted. The area of waveguide ends 610 can be different than the area of waveguide ends 620. Preferably waveguide ends 610 are oriented adjacent to light source means 420 (FIG. 4) and have a smaller area than waveguide ends 620. The regions 640 between tapered waveguides are preferably filled or covered with a reflecting material.

Light transmitting means 430 of FIG. 4 is, for example, a tapered waveguide which has an input surface 435 that accepts light from light source means 420. Other examples of light transmitting means are given in the first embodiment. Through total internal reflection (TIR), the waveguide 430 causes the light rays generated by the light source means 420 to substantially reflect within the waveguide 430. A light extracting means 450 is in optical contact with waveguide 430 and has an input surface 452 and output surface 454. Light extracting means 450 extracts at least a portion of the light flux passing through waveguide 430. The extracted light passes through the input surface 452 and out the output surface 454 of light extracting means 450. Output surface 454 of light extracting means 450 is also the output surface for the illumination system 400.

In order to understand how illumination system 400 functions, some representative arrows are shown in FIG. 4 which represent a sequence of events that may occur to some of the light within illumination system 400. These arrows are shown for illustrative purposes only are not meant to imply that all the light will undergo the same sequence of events. Looking first at light source means 420, at the beginning of the sequence, light is emitted by surface 425 of light source means 420. This light is denoted by arrow 460 in FIG. 4. In addition to being an emitting surface, this surface is also a reflector. The intrinsic luminance or brightness of light source means 420, measured with no other optical structures in the vicinity of light source means 420, is L(intrinsic). Some fraction [x'''] of the light, denoted by arrow 462, from light source means 420 will pass through reflecting means 440 and enter waveguide 430 at the waveguide input surface 435 which has surface area, Area(in). The value of [x'''] can range from 0 to 1. It is preferred that [x'''] be between 0.01 and 0.80. It is more preferred that [x'''] be between 0.01 and 0.60. It is most preferred that [x'''] be between 0.01 and 0.40. The luminance of the light at the input surface 435 is L(in). The solid angle distribution (in air) of the light passing into input surface 435 is $\Omega$(in). At least a portion or all of the light entering waveguide 430 and denoted by arrow 462 will be extracted by light extraction means 450 and will emerge from the illumination system 400 through output surface 454. The solid angle distribution (in air) of the light emerging from the output surface 454 is $\Omega$(out) and the area of output surface 454 is Area(out). The remaining fraction [1−x'''] of the light 460, denoted by arrow 464, will be recycled back to the source 420 by reflecting means 440. The reflectivity of the reflecting surface 425 of light source means 420 is r(1). The fraction of the initial light 460 that is reflected from reflecting surface 425 is [1−x'''][r(1)] and is denoted by arrow 470. The luminance of the light source means 420 will be enhanced by the reflected light. As in the previous embodiments, the light can continue to undergo multiple reflections from the reflecting means 440 and the light source means 420 further enhancing the luminance of light source means 420.

In the example shown in FIG. 4, even if some of the light emitted by the source is recycled back to the source resulting in a source with enhanced luminance, it does not necessarily follow that the output luminance of the illumination system 400 will be greater than the intrinsic luminance of the source. As in FIG. 1, the parameters Area(in), Area(out), $\Omega$(in) and $\Omega$(out) are also important. The calculations of the relationships between output luminance and these parameters are similar to the calculations shown in equations (5)–(7). In many practical applications, Area(out) is much larger than the Area(in) of each light source. In such a case, the light extracting means may need to include a light collimating means in order to achieve a situation where L(out) is greater than L(intrinsic). Examples of light collimating means are given above in the first embodiment related to FIG. 1.

The examples shown in FIGS. 1–6 are meant to convey possible embodiments of this invention and are not meant to limit the scope of the invention. As will be known to someone skilled in the art, additional reflectors may be placed around the light source means in FIGS. 1, 2 and 4 in a similar manner as in FIG. 3 without departing from the scope and spirit of the present invention. Additional light source means may also be added to the configurations shown in FIGS. 1–4 or in modified configurations.

Increased brightness through recycling of the light rays was demonstrated in the laboratory as discussed in the following three examples. In the first, a one-lamp illumination system was constructed. This system was composed of a tubular fluorescent lamp 0.102" (2.6 mm) in diameter, a hollow Spectralon™ tubular diffuse reflector surrounding the lamp and having a slit opening approximately 0.07" wide along the length of the tube, an acrylic waveguide (4" wide, 6" long and 0.062" thick) with one edge (4" by 0.062") illuminated by the fluorescent lamp through the slit in the Spectralon™ lamp reflector, a diffuse reflector (4" by 0.062") positioned on the edge of the waveguide opposite the lamp, and 0.025" by 4" strip of collimation sheet attached to one of the 4" by 6" surfaces of the waveguide with a pressure sensitive adhesive. The collimation sheet was composed of prisms and lenses designed according to the teaching in U.S. Pat. No. 5,521,725, for an Illumination System Employing an Array of Microprisms, assigned to the same assignee as the present application and incorporated herein by reference. The collimation sheet had an elliptical light output distribution with an angular spread (at 50% of the peak luminance) of approximately ±8° along one axis of the ellipse and ±13° along the perpendicular axis of the ellipse.

The intrinsic luminance of the fluorescent lamp with no surrounding optical components was measured to be 8,000 foot-Lamberts (fL). The light output luminance of the illumination system configured as described in the preceding paragraph (measured at the output of the collimation sheet) with the lamp placed in the system as described above was approximately 15,000 fL. Therefore, the output luminance of the illumination system was over 1.8 times greater than the intrinsic luminance of the lamp source. When the diffuse reflector located at the end of the waveguide opposite the lamp was removed to prevent light from being recycled from the waveguide back to the lamp source, the output luminance of the system dropped to below 8,000 fL (i.e., less than the intrinsic source luminance).

In the second example, a two-lamp illumination system was constructed. This system was composed of an acrylic waveguide 3.2" wide by 2.4" long by 0.25" thick, two tubular fluorescent lamps 0.157" (4.0 mm) in diameter placed along the opposing 3.2"×0.25" edges of the acrylic waveguide, curved silver-coated specular reflectors surrounding each fluorescent lamp and directing the light from each lamp into the waveguide, and a 3.2" by 2.0" strip of collimation sheet attached to one of the 3.2" by 2.4" surfaces of the waveguide with a pressure sensitive adhesive. The collimation sheet was composed of prisms and lenses designed according to the teaching in U.S. Pat. No. 5,521,725, for an Illumination System Employing an Array of Microprisms, assigned to the same assignee as the present application. The collimation sheet had an elliptical light output distribution with an angular spread (at 50% of the peak luminance) of approximately ±8° along one axis of the ellipse and ±13° along the perpendicular axis of the ellipse.

The intrinsic luminance of each fluorescent lamp with no surrounding optical components was measured to be 10,000 foot-Lamberts (fL). The light output luminance of the illumination system configured as described in the preceding paragraph (measured at the output of the collimation sheet) with the lamp placed in the system as described above reached 22,000 fL. Therefore, the output luminance of the illumination system was approximately 2.2 times greater than the intrinsic luminance of the lamp source.

In the third example, a six-lamp illumination system was constructed. This system was composed of an acrylic waveguide 6" wide by 6" long by 1" thick, six tubular hot cathode fluorescent lamps 7 mm in diameter placed along the opposing 6"×1" edges of the acrylic waveguide (three lamps on each side), white diffuse reflectors surrounding each set of three fluorescent lamps and directing the light from the lamps into the waveguide, and a 1" by 1" glass right angle prism attached to one of the 6" by 6" surfaces of the waveguide with a pressure sensitive adhesive.

The intrinsic luminance of each of the fluorescent lamps with no surrounding optical components was measured to be 23,667 candela per square meter (Cd/m$^2$). The light output luminance of the illumination system configured as described in the preceding paragraph (measured at the output of the right angle prism) with the lamp placed in the system as described above was approximately 235,000 Cd/m$^2$. Therefore, the output luminance of the illumination system was over 9.9 times greater than the intrinsic luminance of the lamp source.

It should be understood that this invention is applicable to a wide variety of devices such as direct illumination devices, projection display devices, as well as flat panel displays for automotive instrument panels, games, broadcast television receivers, military, aerospace and avionics-related applications, computer monitors, and any other device that provides alphanumeric, numeric, data, or video information.

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, it should be understood that other variations and combinations are possible using the structures disclosed in the referenced patent applications.

What is claimed is:

1. An optical illumination system, comprising:
   (a) a light source means for generating light rays, where the light source means has a reflective emitting surface and an intrinsic luminance, L(intrinsic);
   (b) a light transmitting means having a light input surface in close proximity to said light source means;
   (c) a light reflecting means separate from the light source means to reflect and recycle a portion of the light emitted from said light source means back to said light source means; and
   (d) a light extracting means to extract a portion of the light in said light transmitting means, said light extracting means comprising:
      (i) a light input surface in optical contact with one surface of said light transmitting means;
      (ii) a light output surface through which the extracted light is directed; and optionally
      (iii) a light collimating means interposed between and contiguous with the light input and the light output surfaces of said light extracting means whereby the output of the illumination system is more collimated than the input light to the light transmitting means, whereby, the output luminance of the optical illumination system is enhanced.

2. An optical illumination system of claim 1, where said output luminance of said optical illumination system is greater than the intrinsic luminance, L(intrinsic), of said light source means.

3. An optical illumination system of claim 1, wherein said light source means is a fluorescent light source.

4. An optical illumination system of claim 1, wherein said light source means is at least one light emitting diode.

5. An optical illumination system of claim 1, wherein said light transmitting means is an optical waveguide.

6. An optical illumination system of claim 1, wherein said light transmitting means is a hollow waveguide.

7. An optical illumination system of claim 1, wherein said light extracting means includes a light collimation means for directing the light rays into a pattern of substantially collimated light.

8. An optical illumination system of claim 7, wherein said light collimating means comprises an array of microprisms wherein each microprism comprises:
   (i) a light input surface optically coupled to said light transmitting means;
   (ii) a light output surface distal from said light input surface; and
   (iii) a first sidewall disposed between and contiguous with said light input surface and said light output surface and forming a tilt angle with respect to the normal of the surface of said light transmitting means.

9. An optical illumination system of claim 7, wherein said light collimating means comprises a low index of refraction layer disposed between said light transmitting means and said light collimating means.

10. An optical illumination system of claim 8 further comprising an array of microlenses, wherein the output of each microprism is directed to at least one corresponding microlens.

11. An optical illumination system of claim 1, wherein said light source means and said light reflection means are disposed at opposite ends of said light transmitting means such that a portion of the light rays from the light source means travels to the light reflection means and back to the light source means.

12. An optical illumination system of claim 1, wherein said light reflection means comprises a second light source means having a reflective surface.

13. An optical illumination system of claim 12, wherein said light source means and said light reflection means comprising a second light source means are disposed at opposite ends of said light transmitting means.

14. An optical illumination system of claim 1, wherein said light reflecting means partially surrounds the light source means.

15. An optical illumination system of claim 1, wherein said light reflection means is situated between said light source means and said light transmitting means.

16. An optical illumination system of claim 15, wherein said light reflection means comprises a lenticular array of prisms.

17. An optical illumination system of claim 15, wherein said light reflection means comprises an array of tapered waveguides.

* * * * *